Dec. 15, 1959     J. H. BLOMSTRAND     2,916,802
TOOL HOLDER
Filed July 11, 1955
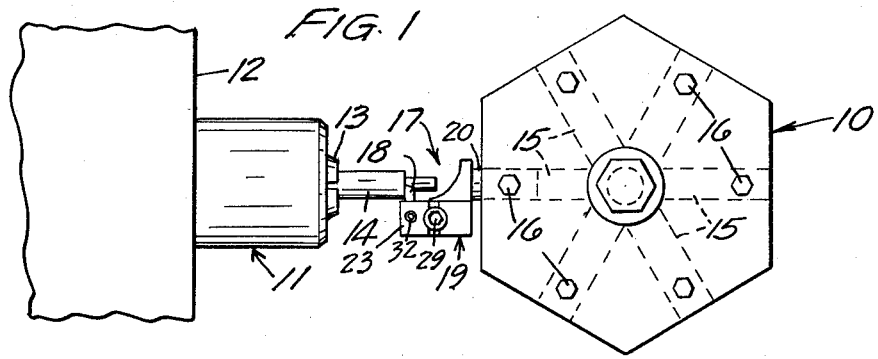
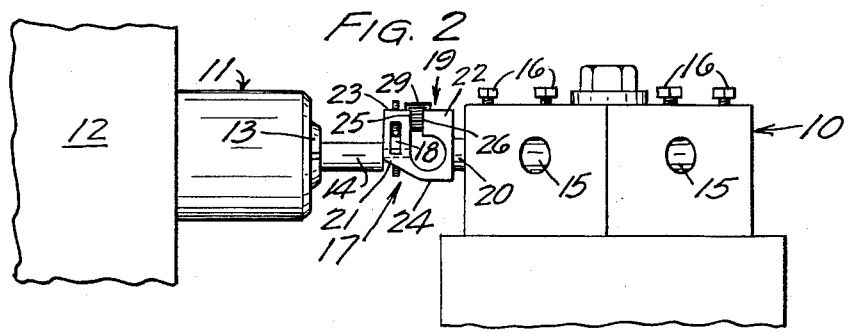
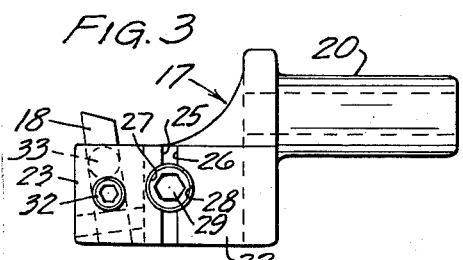
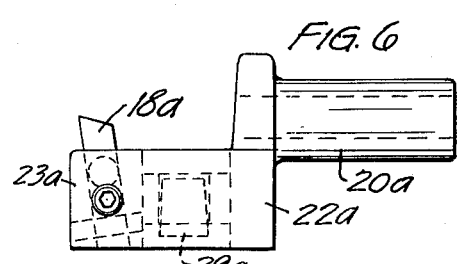
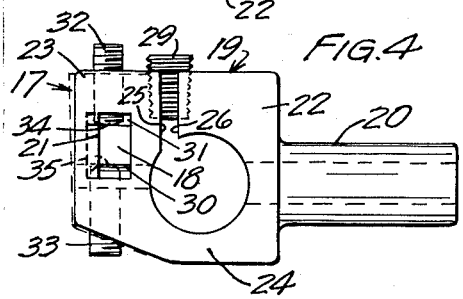
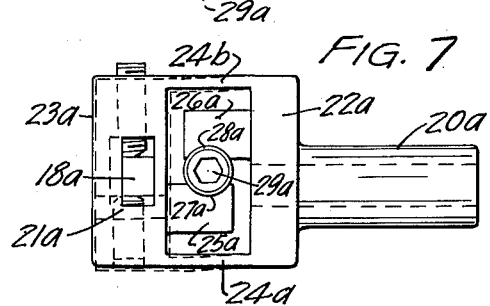
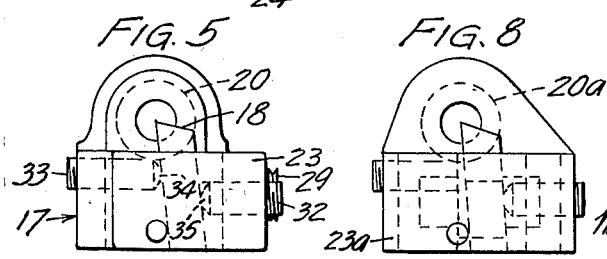
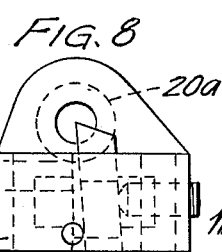
INVENTOR.
JOHN H. BLOMSTRAND
BY
Williamson, Schroeder, Adams & Meyers
ATTORNEYS

United States Patent Office 2,916,802
Patented Dec. 15, 1959

2,916,802

TOOL HOLDER

John H. Blomstrand, Minneapolis, Minn., assignor of one-half to Frederick W. Nyquist, St. Paul, Minn.

Application July 11, 1955, Serial No. 520,981

7 Claims. (Cl. 29—97.5)

This invention relates to a tool holder and more particularly to a finely adjustable holder for tools used in precision machinery.

In the use of machines such as lathes, drilling machines, jig borers and the like, it often becomes desirable to produce a number of duplicate articles all to the same dimension and having predetermined permissible size variation. Because of the close tolerances required in present day practice, variations as small as ten-thousandths of an inch often result in a finished workpiece which will be rejected. To hold tolerances of this order, it is necessary to control or compensate for variables caused by thermal expansion of the workpiece, the machine components, the tool holder and the tool. Similar variables result from mechanical stresses and wear of the tool itself, and these, too, are of sufficient magnitude to require control or compensation. It is relatively simple by any of many conventional means such as adjustable slides, pivoted tools, set screw adjustments, etc., to effect settings which are correct within several thousandths. However, finer adjustments are seldom made without considerable difficulty and expenditure of time. Frequently a substantial number of valuable parts are scrapped in the process. Considerable work has been done in prior art to control thermally caused displacements by such means as thermostats and heating and cooling devices.

Even where thermal expansion is accounted for, there are other factors such as ordinary wear at the tip of the tool which tends to increase the diameter of each successive workpiece as the tool point wears by an infinitesimal increment each time a workpiece is machined.

For the foregoing reasons, the operator tends to leave well enough alone if the tool has been adjusted to produce a workpiece within the tolerance range permitted. Actually adjusting the tool so that the workpiece will lie within a specific portion of the dimension tolerance is such a task that the operator is usually content merely to have the tool produce a workpiece within the extremes of tolerance limit. It can readily be seen that, if the adjustment barely qualifies, then the likelihood of obtaining rejects is much greater than if the tool were to be substantially at a perfect setting prior to producing a series of work-pieces or articles.

It is a general object of this invention to overcome the foregoing difficulties and objections to prior art conventional tool holders and to provide a novel tool holder which will give easy and quick adjustment of the tool within a relatively small range with considerably increased accuracy.

It is another object of the invention to provide a tool holder which will facilitate compensation for variables affecting the accuracy of a cutting machine and which will be so constructed as to be capable of fine controlled adjustment, either in retracting or advancing the tool during production of a series of workpieces and with a minimum of cut and try adjustment while machine production is held in abeyance.

A further object of the invention is to provide a holder for tools in precision machinery where the moving parts together with their attendant backlash and inaccuracy are not relied upon to make fine adjustment, but rather where a solid holder is subjected to controlled distortion to effect the adjustment.

It is a still further object of the invention to provide a firm and chatter-free tool holder of the class described in which the tool, during its fine adjustment, is caused to move in a controlled path and by elastic deformation of the tool holder itself.

These and other objects and advantages of my invention will more fully appear from the following description, made in connection with the accompanying drawing, wherein like reference characters refer to the same parts throughout the several views and in which:

Figure 1 is a plan view of a diagrammatic representation of a rotatable lathe chuck and tool-holding turret with a workpiece and my tool holder in proper relative position;

Figure 2 is a front elevation of the same diagrammatic parts;

Figure 3 is an enlarged top view of my tool holder with a cutting tool secured in position therewith, hidden portions being indicated in dotted line configurations;

Figure 4 is an enlarged front elevation of the tool holder of Figure 3, the deflected position of the tool-holding block being indicated in dotted lines and somewhat exaggereated for clarity;

Figure 5 is an end view of my tool holder as shown in Figure 3, hidden portions being indicated in dotted line;

Figure 6 is a plan view of an alternate form of my invention, hidden portions being indicated in dotted line;

Figure 7 is a front view of the alternate form of my invention, the deflected position of the body being indicated in exaggered form by dotted lines; and Figure 8 is an end view of the alternate form of Figure 6.

With continued reference to the drawing, it is contemplated that my tool holder device will be adaptable to a number of types and varieties of precise machines, the illustrated machine being diagrammatic in form and representing a turret lathe. The turret is indicated generally at 10 and the chuck is indicated generally at 11. The chuck is rotatably mounted in a lathe head 12 and is provided with jaws 13 which, in turn, are capable of clamping a workpiece 14 in secure relation and for turning on an accurate center line. The turret 10 is provided with a number of mounting members 15 having a fastener such as bolt 16, as shown. The particular mounting position of the turret 10 is such as to hold rigidly my tool holder which is shown generally at 17 in the drawing. The tool holder, in turn, is adapted to hold a tool 18 such as a lathe-cutting tool in proper relation with the workpiece 14 and may be advanced in parallel relation and adjusted laterally of the center line of the workpiece in conventional manner and by mechanism not shown. The adjustment of my tool holder is intended to be a fine adjustment independently made and without effect upon the relative movement between the workpiece and the turret.

My tool holder 17 is constructed of a firm and continuous body member designated generally at 19 which, in turn, has a mounting member such as bar or shank 20 for securing to the machine part such as turret 10 and also has a tool clamp 21 so mounted and arranged as to permit the accurate advancing and retracting adjustment characteristics of the tool holder according to my invention.

The body member 19 is made up of a first block 22 and a second block 23 with a web 24 interconnecting the blocks 22 and 23. It is intended that the web 24 have slightly greater resilience than the remainder of the tool holder body 19 so that the body may be flexed very slightly, particularly through the web portion, and that this slight flexing or distortion of the body be utilized to effect accurate adjustment of tool 18. In the form shown in Figures 1 through 5, the body 19 has a general U-shape with a pair of spaced-apart abutments 25 and 26 presenting opposed surfaces 27 and 28, as shown in Figure 3, and being remotely positioned with respect to web 24, as shown in Fig. 4. The opposed surfaces 27 and 28 are preferably arcuate in shape and define a threaded hole or opening within which a threaded bolt or screw 29 may be received. Either the arcuate surfaces 27 and 28, the screw 29, or both, may be tapered downwardly and inwardly so that turning the screw 29 will spread and retract the blocks 22 and 23, as desired.

The block 23 retains the tool clamp 21 and this clamp 21 may be more-or-less conventional in nature. In the form shown, a bearing fulcrum 30 is positioned in an opening 31 formed laterally through the block 23, as shown in Figures 2 and 4. A clamping bolt 32 is threadably disposed within the upper part of the block 23 and an opposed bolt 33 is similarly threadably positioned in the lower portion of block 23. The ends 34 and 35 of the respective bolts 32 and 33 extend inwardly into the space 31 and are adapted to clamp tool 18 while seated against the fulcrum 30, as shown.

In the use and operation of my tool holder, the mounting shank 20 of the device is positioned in a tool mounting member such as turret 10 and the fastening member 16 is drawn up tightly with the device in proper orientation with respect to the turret 10. The workpiece 14 is then placed in the chuck jaws 13 and the chuck is drawn up tightly with the workpiece clamped securely therein. A trial cut is taken to determine whether the tool is within the range of fine adjustment. Having once set the tool holder 17 in approximately correct position, the remainder of the adjustments may be made by the adjusting bolt or screw 29. The tapered cooperation between the bolt 29 and the opposed abutment surfaces 27 and 28 is such as to spread the blocks 22 and 23 when the tapered bolt is turned inwardly, as shown in Figure 4. Since the interconnecting web portion 24 has a slight degree of resilience, the entire body 19 will be spread under stress. The tool 18 has its point above the center line of workpiece 14 as is evident from Figure 2. Spreading the block 23 with respect to block 22 which is rigidly secured with the mounting bar 20 will thus move block 23 in a somewhat radial fashion as the web member 24 distorts. The outermost edge of the block 23 will, therefore, move outwardly and assume the position indicated by the dotted line when the screw 29 has been advanced inwardly. As previously noted, the dotted line position is exaggerated for purposes of illustration. The tool 18 will, therefore, become lowered and the point of the tool will take a deeper cut in workpiece 14. Since the body 19 is under stress, the tapered screw 29 may be retracted and the stressed or distorted body will flex inwardly while maintaining a compressive force upon the screw. As will be evident from Figs. 3 and 4, the cooperating compressive engagement of screw 29 with the arcuate abutment surfaces 27 and 28 firmly stabilizes the entire body against flexing laterally to the intended direction of distortion. Since there are no surfaces separated by oil films or no relatively moving parts other than the tapered contact between the adjusting screw 29 in conjunction with the abutment faces 27 and 28, no backlash or slack can develop to throw off the positive and negative adjustment. Thus, where advancing the tapered adjusting screw 29 in a downward direction will distort the body 19 and depress the tool 18 by several thousandths of an inch for a quarter of a turn, reversing the adjusting screw 29 through the same quarter of a turn will cause the tool 18 to recede by the same few thousandths of an inch.

It will become immediately apparent that my extremely simple tool holder has provided a means for accurate fine adjustment and that, when the finished dimensions of a series of workpieces begin to approach the limit of tolerance range, I may quickly adjust the tool holder in the required direction to compensate therefor without resetting the tool. Thus, warming of the lathe head 12 or the turret 10, or any other differential thermal effect such as created through conducted heat from an electric motor may be adjusted and compensated for at the same time wear of the tool 18 can be accounted for and whether the foregoing causes of inaccuracy are compounded or off-setting. Each workpiece becomes the measure of adjustment for the succeeding one and if the machine itself is accurate, much closer tolerances may be held during a production run. The operator of a machine is more apt to make adjustments as required rather than to permit the workpiece to approach the outer limits of tolerance before acting.

In order to permit a positive or negative adjustment, I prefer that the tapered adjusting screw 29 be advanced to an intermediate position so as to place sufficient stress and strain upon the body 19 to permit considerable retraction while still maintaining a compressive force on the blocks 22 and 23. At the same time, I desire to have a sufficient reserve of resilience in the web portion 24 to permit further advancement of the tapered screw 29.

Since the accuracy of my tool holder is so pronounced and the backlash present in conventional tool holders has been all but eliminated, I may actually measure positive and negative adjustment in terms of the rotative position of the tapered screw 29. I may thus employ indicia (not shown) which will indicate the amount of advancement or retraction of the tool linearly with respect to the rotative movement of the adjusting screw 29.

In the alternate form of my invention shown in Figures 6, 7 and 8, the same principle of flexure or distortion is employed. However, the pathway of tool 18a is slightly different than that of tool 18 in the first mentioned form. Since flexure about the web area 24 causes a movement in the nature of radial turning, the tool 18 will move outwardly as well as downwardly when the tapered screw 29 is advanced. In some instances, it is desired to maintain the tool in parallel relation and to move it vertically during adjustment without permitting the tool to rotate or move laterally. The alternate form is, therefore, so constructed that block 22a and block 23a are interconnected by a pair of webs 24a and 24b. These webs may be even thinner than that of the first mentioned form and are preferably of identical structure so that the distortion thereof will be uniform. Webs 24a and 24b lie in spaced relation and are secured to or formed integrally with the blocks 22a and 23a, as shown. An abutment 26a is formed rigidly with the block 22a and an abutment 25a is similarly formed with the block 23a. An abutment surface 28a lies in opposed spaced relation with abutment surface 27a. A tapered adjusting screw 29a may be threadably inserted between the abutment surfaces 27a and 28a, as shown in Figure 7. Mounting shank 20a and the tool holding means 21a may be identical with the counterparts of the first form shown and tool 18a may be similarly mounted.

When the tool holder of Figures 6, 7 and 8 is mounted in position and it is desired to condition the holder for use, the threaded screw 29a is turned inwardly to place the abutments 25a and 26a under compression. Thus, when it is desired to raise or lower the tool 18a, the tapered screw 29a may be retracted or advanced respectively. When the screw 29a is advanced, the webs 24a and 24b are distorted in the direction indicated by the dotted line position and the entire block 23a will be slightly lowered but maintained in substantially the same plane. The effect will be to lower tool 18a without turning it with respect to the horizontal. There may, of course, be a microscopic shift of the tool 18a inwardly as the block 23a is flexed downwardly, but the tool will still be maintained in parallel relation with the original position thereof. Here again, it is understood that the block 22a and its associated mounting shank 20a and abutment 26a are rigidly formed and have a lesser resilience than the interconnecting webs 24a and 24b. The same remarks are, of course, applicable to the block 23a and its associated tool clamp 21a and abutment 25a.

The use and operation of the alternate form of my invention will be obvious from the foregoing, and the same freedom of backlash and the same accuracy of adjustment may be attributed to this form as in the first form illustrated. In addition, it is to be noted that tool 18a is prevented from assuming a changed orientation during the adjusting procedure.

It may thus be seen that I have devised a novel and simple tool holder which employs elastic deformation of the tool holding body itself in order to effect rapid and extremely accurate adjustment of a cutting tool.

It will, of course, be understood that various changes may be made in the form, details, arrangement and proportions of the parts without departing from the scope of my invention.

What I claim is:

1. A tool holder comprising a body member having a pair of abutments rigidly formed therewith in spaced relation, said abutments having threaded opposed surfaces, mounting means rigidly secured to said body member adjacent one of said abutments for mounting the tool holder in a machine such as a lathe, a tool clamp adjacent the other of said abutments for clamping rigidly a tool such as a lathe-cutting tool, said body member having slight resilience at a medial portion thereof intermediate said spaced abutments and spaced remotely therefrom, and screw means threadably mounted in contact with both of said opposed threaded abutment surfaces, at least one of said means and said pair of abutment surfaces having a slight taper for forcing under constant compressive force the abutment surfaces divergently against resilience of said body, whereby, during use, the tool clamp will be moved slightly together with a tool mounted therein to adjust the position thereof relative to said mounting means.

2. A tool holder comprising a body member having a pair of spaced abutments with respectively opposed surfaces, said surfaces having tapped arcuate sides defining a generally circular opening, mounting means rigidly secured to said body member adjacent one of said abutments for mounting said tool holder in a machine such as a lathe, a tool clamp adjacent the other of said abutments for clamping rigidly a tool such as a lathe-cutting tool, said body member having an intermediate portion positioned in spaced relation with respect to said abutments of slightly greater resilience than the remainder thereof, and a threaded rotatable member lying in tapered engagement for a substantial portion of its side area with the tapped arcuate sides of said abutments and under constant compressive force therebetween whereby rotative movement of said threaded rotatable member will elastically deform said body member during use and will adjustably move a tool mounted in said tool clamp.

3. In a device for holding tools in a machine, a first rigid block having means for mounting in the machine, a second rigid block positioned closely adjacent the first block and having means for mounting a tool rigidly therewith, confronting threaded areas on the respective rigid blocks, an interconnecting web between said first and second blocks and spaced remotely from said threaded areas, said web having lesser resistance to elastic deformation than the blocks themselves, and tapered and threaded means lying in constant compressive engagement at opposed side areas along a substantial portion of its length and between the confronting threaded areas of said first and second blocks and movable for slightly spreading and retracting the blocks in their relative positions whereby, during use, a tool held in said second block will be moved slightly for adjustment relative to the workpiece.

4. In a device for holding tools in a machine such as a lathe, a first rigid block for mounting in the machine, a second rigid block positioned adjacent the first block for holding a tool, a web of lesser thickness than each of said blocks rigidly interconnecting them, a threaded abutment surface formed on each of said blocks remotely from the web in opposed and slightly tapered relation and a correspondingly tapered screw lying in constant compressive threaded engagement at opposed side areas thereof with said abutments for flexing the web and hence deflecting a tool held in said second rigid block for fine adjustment thereof relative to said first rigid block.

5. The structure set forth in claim 1, wherein said medial portion of said body member constitutes a web of relatively lesser thickness.

6. The structure set forth in claim 2, wherein said intermediate portion constitutes a pair of webs of relatively greater resilience than the remainder of said body member, said webs lying in spaced relation and at opposite sides of said threaded rotatable member.

7. The structure set forth in claim 2, wherein said medial portion of said body member constitutes a pair of webs each of relatively lesser thickness and positioned one at each side of said screw means.

References Cited in the file of this patent

UNITED STATES PATENTS

| | | | |
|---|---|---|---|
| 1,234,769 | Kelly | July 31, | 1917 |
| 1,277,481 | Robinson | Sept. 3, | 1918 |
| 1,413,326 | Dover | Apr. 18, | 1922 |
| 1,423,245 | Moore | July 18, | 1922 |
| 2,211,039 | Welter | Aug. 13, | 1940 |
| 2,266,339 | Shutz | Dec. 16, | 1941 |
| 2,485,324 | Sheldrick | Oct. 18, | 1949 |
| 2,553,699 | Brodin | May 22, | 1951 |
| 2,584,321 | Auer | Feb. 5, | 1952 |
| 2,587,132 | Finke | Feb. 26, | 1952 |
| 2,753,617 | Felenchak | July 10, | 1956 |